United States Patent [19]

Anders

[11] 4,343,574
[45] Aug. 10, 1982

[54] PNEUMATIC TUBE SYSTEM CUSTOMER TERMINAL CONSTRUCTION

[75] Inventor: Walter G. Anders, Canton, Ohio
[73] Assignee: Diebold, Incorporated, Canton, Ohio
[21] Appl. No.: 156,690
[22] Filed: Jun. 5, 1980
[51] Int. Cl.³ .............................................. B65G 51/26
[52] U.S. Cl. ........................................ 406/13; 49/28;
109/19; 406/21; 406/27; 406/31; 406/73;
406/112
[58] Field of Search ....................... 406/10, 21, 27, 28,
406/29, 31, 73, 74, 110, 111, 112, 13; 109/19;
49/28

[56] References Cited
U.S. PATENT DOCUMENTS

| | | | |
|---|---|---|---|
| 3,237,933 | 3/1966 | Grosswiller et al. | 49/28 |
| 3,610,554 | 10/1971 | Schwarz et al. | 406/112 |
| 3,711,038 | 1/1973 | Van Otteren | 406/112 X |
| 3,828,698 | 8/1974 | Delamater et al. | 109/19 |
| 3,851,843 | 12/1974 | Sandlin | 406/110 |
| 3,948,466 | 4/1976 | Rudder et al. | 406/112 X |
| 4,059,246 | 11/1977 | Anders et al. | 406/110 X |
| 4,135,684 | 1/1979 | Willey | 406/112 X |

Primary Examiner—Jeffrey V. Nase
Attorney, Agent, or Firm—Frease & Bishop

[57] ABSTRACT

A customer terminal for a single conveyor tube banking service pneumatic tube system. The terminal has a cabinet which can be opened by unlocking and removing a hinged front member to expose system components and terminal mechanism. The carrier receive and send housing has a hinged door and the housing communicates with the system conveyor tube. The mechanism is operative automatically to present a carrier arriving at the terminal to a customer seated in an adjacent vehicle. The presented carrier is conveniently positioned at an angle at the outer end of a pocket on the door for removal and replacement by a customer without requiring precise positioning. The carrier is returned automatically to the conveyor tube system when replaced in the door pocket. The door has safety mechanism automatically reopening the door if it encounters an obstacle on closing. The same door safety mechanism which protects a customer against injury also functions to prevent introduction into the system conveyor tube of an overloaded carrier.

34 Claims, 19 Drawing Figures

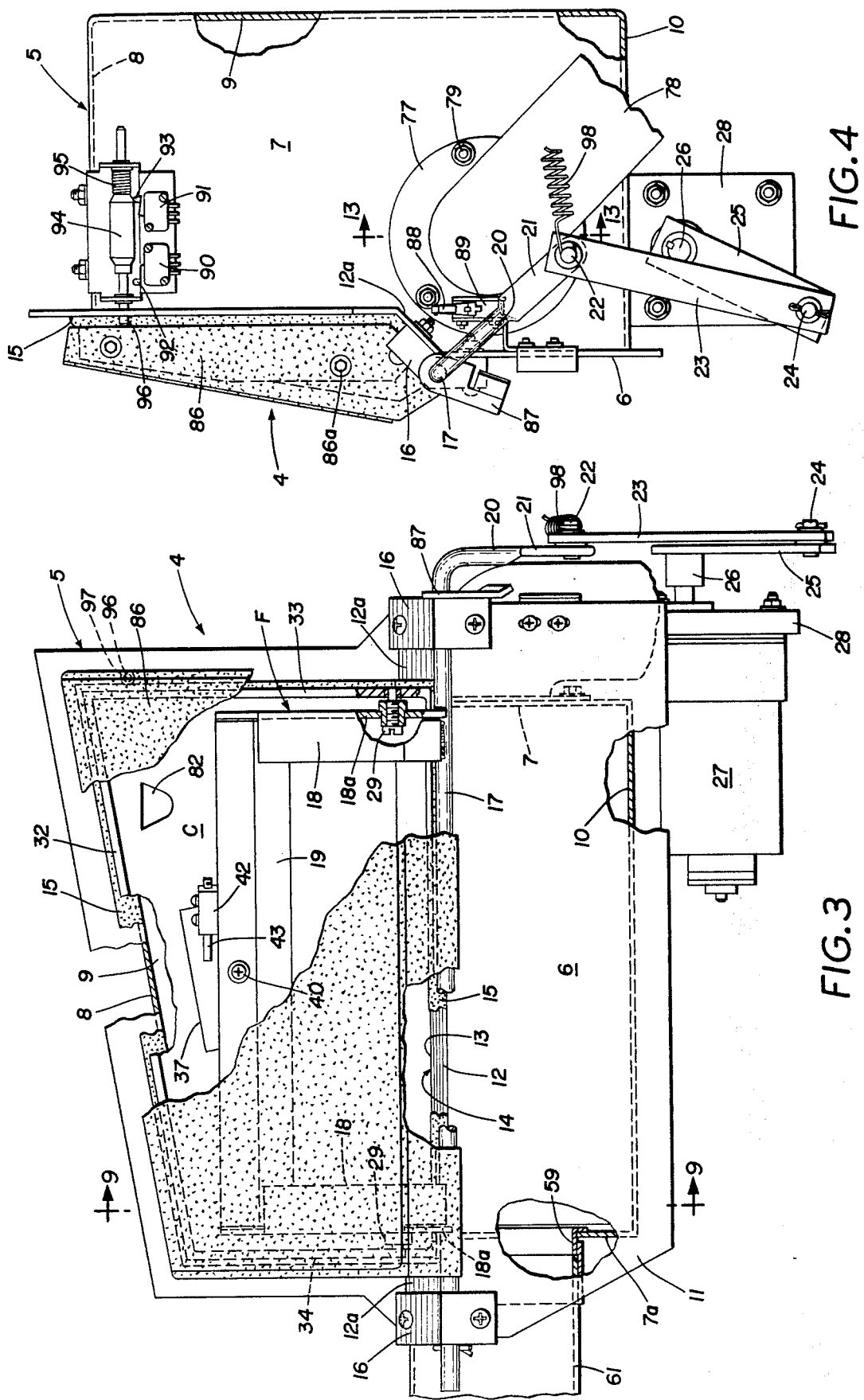

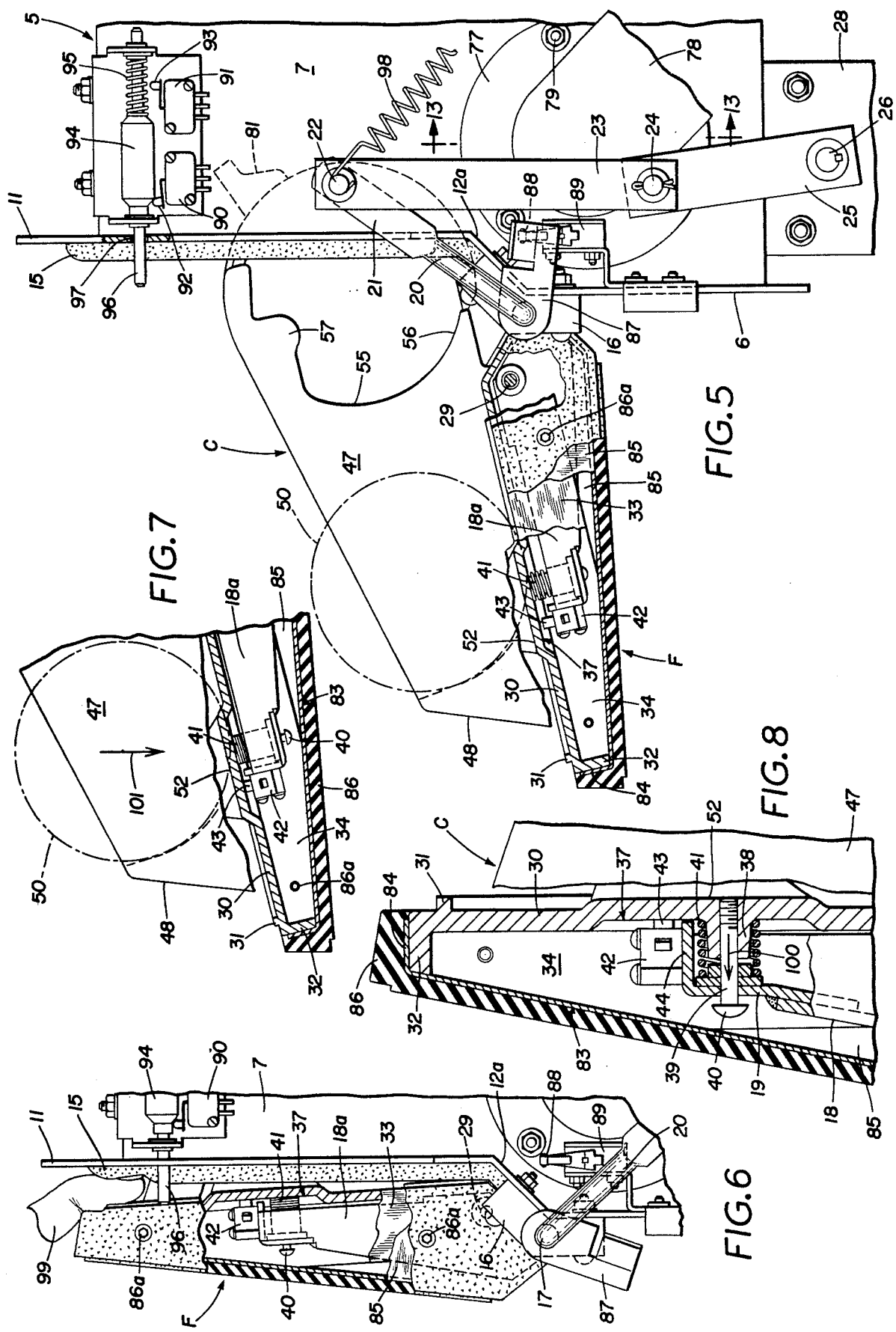

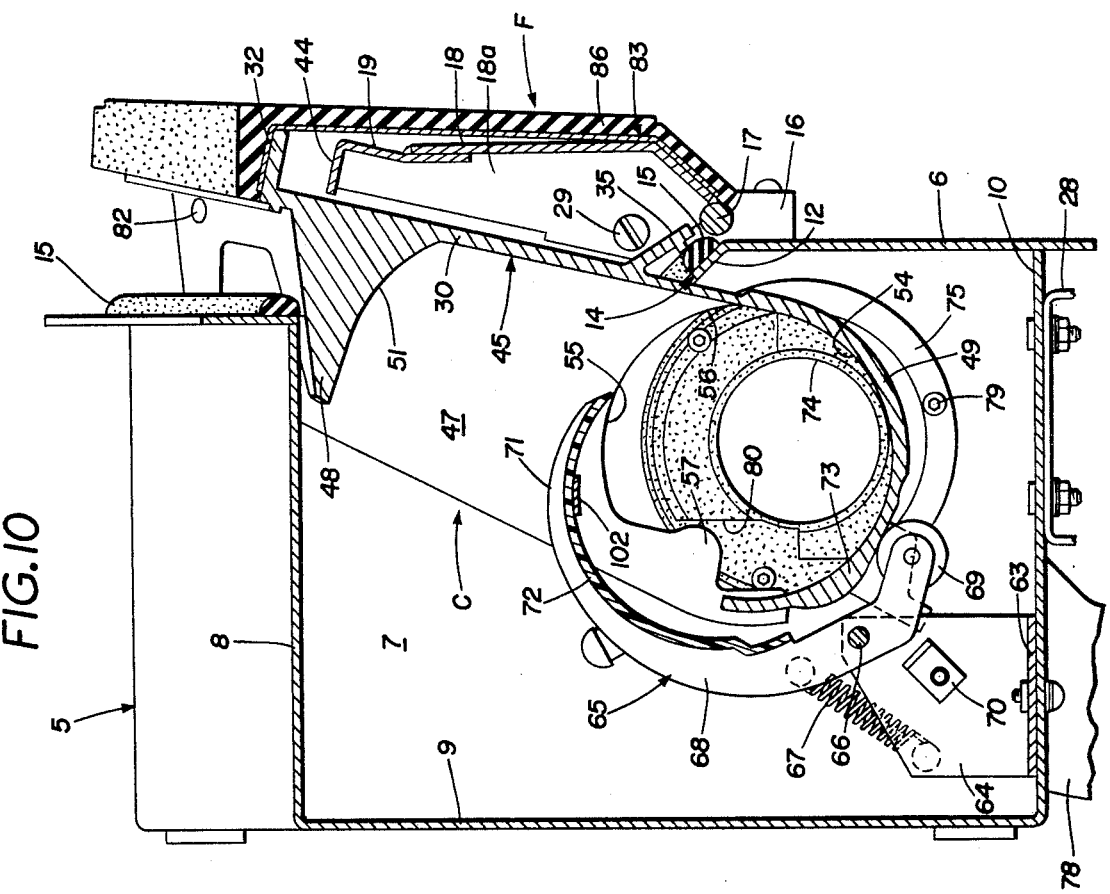
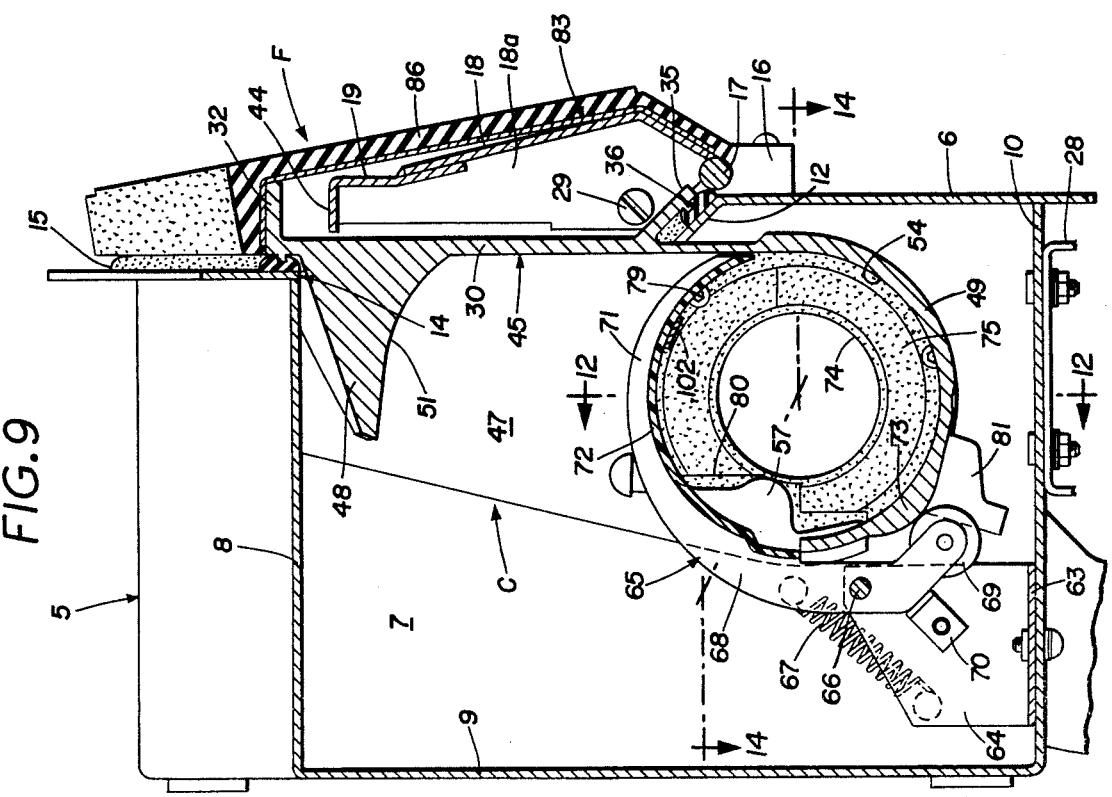

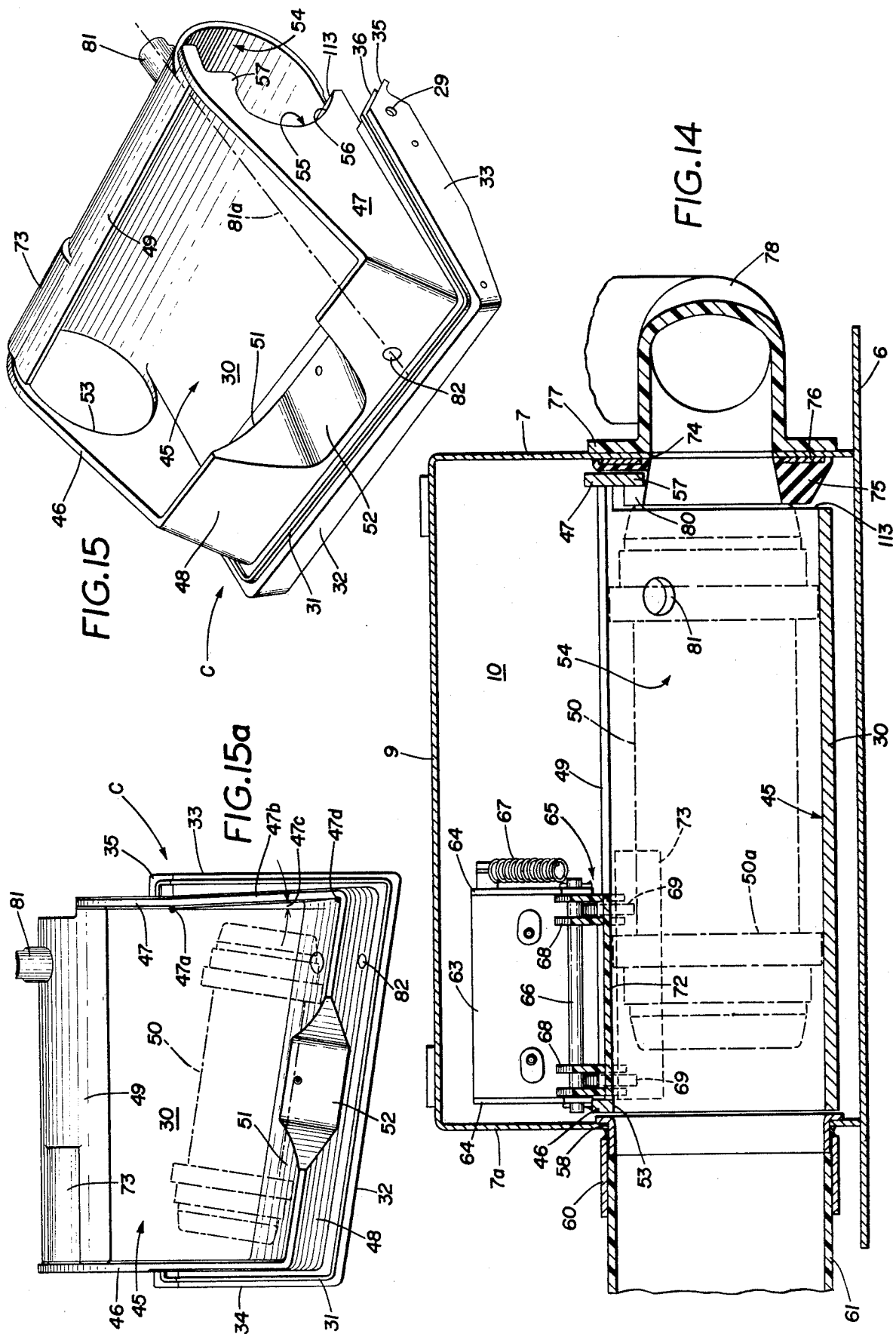

PNEUMATIC TUBE SYSTEM CUSTOMER TERMINAL CONSTRUCTION

CROSS-REFERENCE TO RELATED PATENTS

Components of the pneumatic tube system customer terminal construction comprise improvements of the constructions or components of devices shown in U.S. Pat. Nos. 3,237,933, 3,828,698 and 4,059,246.

BACKGROUND OF THE INVENTION

1. Field of the Invention

The invention relates to a pneumatic tube system in which a carrier is moved rapidly by air pressure or vacuum back and forth through a single conveyor tube extending between customer and teller terminals, the customer terminal being located at an outside drive-up customer banking facility visible from a teller terminal located inside a bank building. More particularly, the invention relates to a customer terminal construction for a pneumatic tube system in which the carrier that passes through the single conveyor tube is removable from the system at both tube terminals.

In addition, the invention relates to a simple customer terminal construction for a pneumatic tube system in which the carrier arrives at the terminal moving in a generally horizontal direction, and in which the carrier may be presented upon arrival automatically at a convenient location and conveniently positioned for removal by a customer seated in an automobile at the drive-up customer terminal. When the customer returns the carrier to the mechanism, it is automatically sent back to a teller terminal without requiring special operating instructions to be given to the customer, and without requiring precise positioning of the carrier in the mechanism.

Moreover, the invention relates to a pneumatic tube system customer terminal of the type described in which safety mechanism is provided for preventing damage to or jamming of the system accidentally, or injury to a customer.

2. Description of the Prior Art

Many types and kinds of pneumatic tube system customer and teller terminals are known for carrying out banking services between a customer drive-up station and a teller inside a bank building with visibility between the customer and the bank teller.

U.S. Pat. No. 3,237,933 shows a pneumatic tube system banking service terminal having a safety device for preventing injury to a user during door closing of a terminal door which presents a captive carrier to a user oriented in a generally vertical direction. However, the construction therein does not provide a mechanism having few parts which will accommodate a door presenting a removable carrier outside the terminal to a customer which door cannot be closed if the customer overloads the carrier and which door cannot injure the customer if the customer's hand or other body portion is not removed from the door during closing.

U.S. Pat. No. 3,828,698 shows a customer terminal for a pneumatic tube system drive-up station in which a removable carrier is presented in a deal drawer which is projected from the terminal toward a vehicle in which the customer is seated, and in which the deal drawer has a safety closure head which stops or reverses drawer movement if the drawer head strikes the vehicle or other object. Such deal drawer construction, however, has complicated mechanisms and does not provide a simple mechanism for presenting a carrier conveniently to a customer and does not provide for avoiding damage to the system by the customer overloading the carrier returned to the terminal.

U.S. Pat. No. 4,059,246 shows a pneumatic tube banking system having separate, differently constructed customer and teller terminals having multiple tubes extending between the terminals. An arriving carrier is presented in vertically oriented position to the customer at the customer terminal and requires special orientation of the carrier by the customer in returning the same to the terminal. Moreover, the terminal disclosed in this patent is not adaptable for a single tube system operation. However, certain of the supply equipment and components for supplying air under differential pressure to the pneumatic tube system may be used in a single tube system.

Other known types of pneumatic tube system terminals, while providing for horizontally extending system tube connection with a customer terminal and for presenting a carrier externally of the terminal to a user, have complicated constructions, numerous parts requiring careful adjustment and difficult maintenance, critical operational sequences, and high cost of manufacture. Such known devices, for example, are shown in U.S. Pat. Nos. 3,610,554, 3,851,843 and 3,948,466.

Accordingly, a need exists in the field of drive-up banking service equipment for a simple pneumatic tube customer terminal construction having relatively few structural and operating components and parts operative automatically to present a carrier, in a single tube system, upon arriving at the customer terminal to a customer seated in an adjacent vehicle, with the carrier conveniently positioned for handling by the customer, without requiring precise positioning of the carrier when it is returned by the customer to the terminal, in which the carrier is returned automatically to a teller when replaced in the mechanism by the customer, and in which the mechanism protects the system against damage by a carrier overloaded by the customer, and also protects against customer injury. Further, a need similarly exists for a simple pneumatic tube system customer terminal construction which avoids the deficiencies and objectionable features described with respect to known prior art.

SUMMARY OF THE INVENTION

Objectives of the invention include providing a new construction, coordination and arrangement of components of a single tube pneumatic tube system customer terminal especially adapted for providing banking services having a carrier transfer cradle pivotally mounted on a terminal housing for handling a carrier arriving at or sent from the terminal through a system tube which transfers a carrier, having a horizontally extending axis as delivered or sent, between locations inside and outside the terminal housing; providing such construction in which the cradle transfers the carrier between a horizontally located position within the terminal housing and an accessible location outside of the housing with the carrier oriented at an angle with respect to its position inside the housing; providing such construction in which said outside angled position presents a carrier readily accessible for removal or replacement from or into the cradle without difficulty by a user, and without the necessity of specially orienting the carrier when replacing it in the cradle; providing such construction in which there is no necessity for providing special use instructions for the user of the customer terminal to carry out a banking operation; providing such construction in which the terminal housing has a door opening, a door pivotally mounted on the housing on a horizontal axis parallel with the horizontal axis on which a carrier is delivered to or sent from the housing in a pneumatic tube system tube, a cradle pivotally mounted on the door on an axis parallel with but spaced from the door pivot axis, and which door and cradle assembly is movable between positions exposing, or closing in sealed relation, the housing opening; providing such construction in which the cradle has related closure mechanism pivotally mounted in the housing to form with the cradle, when the door assembly is closed, an extension of the pneumatic system tube connected with the housing through which a carrier is delivered to or sent from the housing; providing such a construction in which the cradle has walls forming a pocket in which a carrier may roll to transfer the carrier in the cradle pocket one way or another between outside accessible and inside send or receive positions when the cradle door assembly is opened or closed; providing such construction in which the cradle and door assembly is provided with a safety mechanism actuated to prevent closing of the cradle and door assembly if an external object is engaged and pinched between the door assembly and the housing during closing, or if the cradle is overloaded; providing such construction in which the terminal mechanism is mounted within a cabinet that may be opened readily to expose and present all terminal mechanism and components for servicing without disassembly of the components; and providing such construction and arrangement which is simple in construction, reliable in operation, readily serviced, extremely convenient to use, and which overcomes existing problems in the art and satisfies the indicated objectives.

These and other objectives and advantages may be obtained by the single conveyor tube banking service pneumatic tube system of a type having a conveyor tube extending between a teller terminal and a remote customer terminal supplied with a vacuum or pressure from system blower and air shifter units to transport a carrier between such terminals characterized in that the customer terminal in general terms may be stated as including walls forming a terminal housing, and an access opening formed in one of the housing walls; means connecting a horizontally extending axis end of a system conveyor tube to an opening in another housing wall; a door, a cradle pivotally mounted on the door on a horizontal axis, the cradle-door assembly being pivotally mounted on the housing on a horizontal axis spaced from and parallel with both the cradle pivot axis and the conveyor tube axis to form a closure for the access opening movable between closed and open positions; the cradle having a bottom ramp wall, and having first and second spaced side walls and first and second spaced end walls projecting from the bottom ramp wall to form a cradle pocket on said ramp wall, said first side wall being located adjacent the cradle pivot axis and having a semicircular shape in cross section formed on an axis coinciding with the conveyor tube axis when the cradle-door assembly is closed, said cradle end walls being perpendicular to said semicircular side wall axis, a circular carrier entrance opening formed in said first cradle end wall on a center lying in the coinciding semicircular wall and conveyor tube axes when the cradle-door assembly is closed, and an opening of reduced size with respect to said carrier entrance opening formed in said second cradle end wall aligned with said carrier entrance opening; a clamshell-like closure member pivotally mounted in said housing having a generally semicircular wall extending in one direction from said pivot mounting and having an internal curved surface formed on a diameter approximating that of the inner surface curvature of said semicircular cradle side wall, the closure member pivot mounting being spaced from but parallel with the cradle-door assembly pivot axis, said closure member having a portion extending in a second direction from said pivot mounting engaging said semicircular cradle wall when the cradle-door assembly is closed, holding said closure member in position to complete the formation inside the housing of a tubular extension of said conveyor tube, and means biasing said closure member away from said tube extending position when the cradle is disengaged from the closure member during opening movement of said cradle-door assembly; power means for moving the cradle-door assembly between open and closed positions; the cradle ramp wall extending downwardly at an angle with respect to the horizontal from said access opening when the cradle-door assembly is in open position; a carrier discharged from the conveyor tube through said carrier entrance opening into the cradle pocket when the cradle-door assembly is in closed position rolling along said ramp wall in said pocket to said second side wall when the cradle-door assembly is moved from closed to open position; said second pocket side wall acting as a carrier retainer wall when cradle-door assembly is in open position; and a carrier when placed in said cradle pocket resting against said retainer wall when the cradle-door assembly is in open position rolling along said ramp wall to said semicircular cradle side wall as the cradle-door assembly is moved from open to closed position.

BRIEF DESCRIPTION OF THE DRAWINGS

A preferred embodiment of the invention—illustrative of the best mode in which applicant has contemplated applying the principles—is set forth in the following description and shown in the drawings and is particularly and distinctly pointed out and set forth in the appended claims.

FIG. 3 is a front elevation, with parts broken away, illustrating the improved mechanism removed from the cabinet shown in FIGS. 1 and 2;

FIG. 4 is an end elevation of the mechanism shown in FIG. 3, with the housing door in closed position;

FIG. 5 is a view similar to FIG. 4, with parts broken away and in section, showing the housing door open to present a carrier for removal from a cradle mounted on the door;

FIG. 6 is a view similar to portions of FIGS. 4 and 5 showing the housing door being moved toward closed position and starting to pinch the finger of a user;

FIG. 7 is a fragmentary view of certain portions of the mechanism of FIG. 5, illustrating actuation of a safety device when an overloaded carrier is returned to the cradle;

FIG. 8 is an enlarged fragmentary sectional view of a portion of FIG. 5 illustrating the manner in which the cradle is mounted on the door and the control mechanism therefor;

FIG. 9 is a fragmentary sectional view taken on line 9—9, FIG. 3, illustrating a clamshell-like extension, within the housing, of the pneumatic tube which is connected to the housing, with the housing door in closed position ready to accept delivery of a carrier into the housing from the system tube;

FIG. 10 is a view similar to FIG. 9 showing the mechanism components in their changed positions during initial opening movement of the housing door;

FIG. 14 is a plan sectional view of the mechanism taken on the line 14—14, FIG. 9;

FIG. 15 is a perspective view of the cradle detached from the mechanism;

FIG. 15a is a plan view of the cradle shown in FIG. 15;

Similar numerals refer to similar parts throughout the various figures of the drawings.

DESCRIPTION OF THE PREFERRED EMBODIMENT

Figure 1:
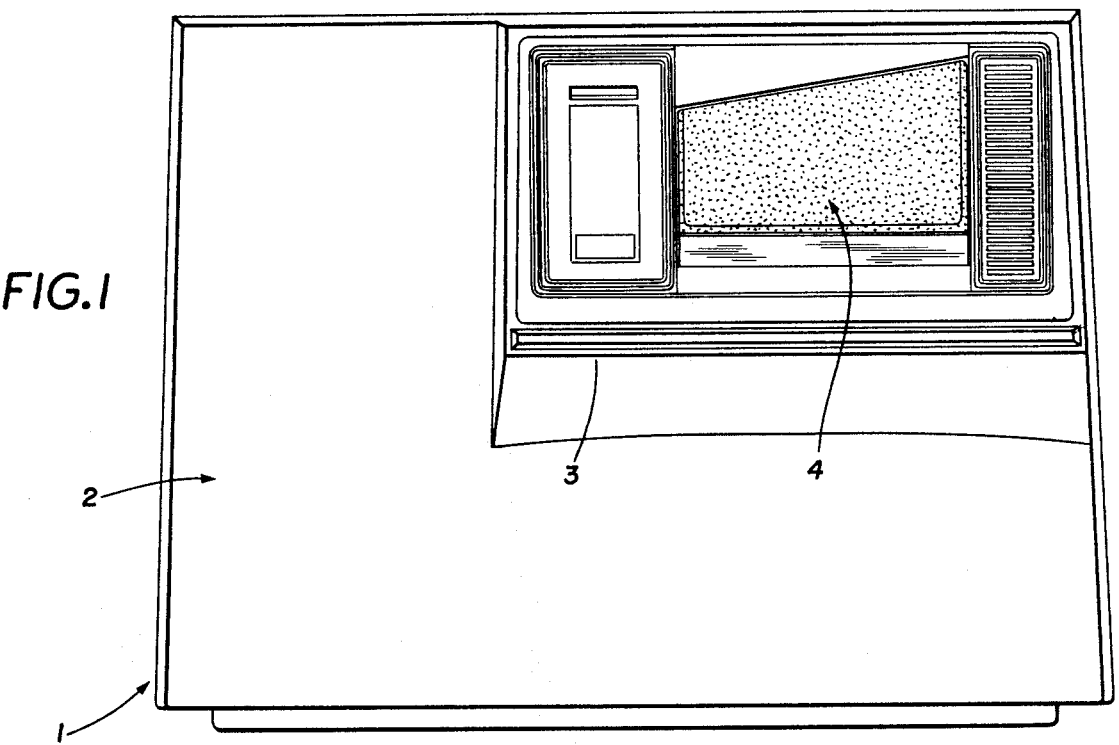
FIG. 1 is a front elevation of a pneumatic tube customer terminal equipped with the new construction.

A pneumatic tube banking system customer terminal incorporating the concepts of the invention is indicated generally at 1. The terminal 1 is designed to permit communication and physical banking transactions between such terminal located at a bank drive-up station and a teller terminal located inside a bank building, preferably with visual communication between the customer and teller and verbal communication by known audio systems.

The drive-up station where the terminal 1 is located is available for use of a customer in an automobile which has approached the drive-up station so that the customer may see the bank teller through a window in the bank building and where the bank teller in the bank building may see the customer in the automobile. Several customer terminals may be served by one teller with the visual communication described, as is known in arranging customer terminals at drive-up stations as shown in U.S. Pat. No. 4,059,246.

The terminal 1 includes a cabinet generally indicated at 2, described below, and the cabinet 2 has a framed opening 3 through which the customer terminal mechanism, generally indicated at 4 mounted within the cabinet 2, is accessible. The terminal mechanism 4 includes a housing generally indicated at 5 having a front wall 6, side walls 7 and 7a, an angled top wall 8, a back wall 9 and a bottom wall 10, FIGS. 3 and 4. The front wall 6 may have an outturned flange portion 11 extending completely around the front edges of the top wall 8, the side walls 7 and the bottom wall 10.

A shoulder wall 12 extends laterally across the housing between the side walls 7 and 7a intermediate the top wall 8 and bottom wall 10. Shoulder flange portions 12a form an offset in the surrounding housing front wall outturned flange portion 11 at the ends of the shoulder 12 so that the plane of the upper portion of flange 11 above the shoulder 12 is offset toward the rear with respect to the plane of the front wall 6 and the flange 11 surrounding the front wall 6 below the angled shoulder wall 12.

The upper horizontal edge 13 of the shoulder wall 12 forms the lower edge of a trapezoidal opening 14 for the housing 5. The intersections between the portions of the housing side walls 7 and 7a and the flange 11 above the shoulder wall 12 form the ends of the trapezoidal opening 14 in the housing. The intersection of the angled top wall 8 with the flange 11 defines the top portion of the trapezoidal opening generally indicated at 14.

The opening 14 is surrounded by a continuous compressible seal 15, also extending in a trapezoidal shape around and cemented on the front surface of the flange 11 at the top and sides of the opening and along the angled shoulder wall 12.

Spaced bushing blocks 16 are mounted on the angular flange portions 12a and on the flange portion 11 therebelow journaling a pivot shaft 17 to which the bottom ends of end angle members 18 are welded. The upper ends of members 18 are welded to a cross angle member 19. The pivot shaft 17, the end members 18 and the cross member 19 form a basic door frame, generally indicated at F, for the mechanism.

Pivot shaft 17 has a downturned angular end 20 having a flattened portion 21 pivotally connected at 22 to one end of a link 23 which is pivotally connected at its other end 24 to a crank arm 25 mounted on a drive shaft 26 of reversing drive motor means 27 which drives the door frame F between open and closed positions. The motor means 27 may be mounted in any suitable manner by a bracket 28 (FIGS. 4 and 9) carried by the housing 5.

A cradle, generally indicated at C, is pivotally mounted at 29 on the lower ends of door frame angle member side flanges 18a. The cradle C has a trapezoidal shaped bottom wall 30 matching the trapezoidal shape of the trapezoidal opening 14 but slightly larger than the opening 14 so that a seal rib 31, extending around the top and side edges of the top surface of the bottom wall 30, engages seal 15 and seals the door and cradle assembly F-C at these locations against the housing 5 to assist in providing a sealed closure for the opening 14 for a purpose to be later described.

A flange 32 extends downward from the underside of the cradle bottom wall 30 along the top trapezoidal angled edge thereof. Similar flanges 33 and 34 project downward from the bottom wall 30 along the long and short trapezoidal ends thereof, respectively. The inner portion of the cradle bottom wall 30 is formed with an angular flange 35 (FIG. 9) which is spaced slightly above the housing shoulder wall 12 when the door F is closed. Flange 35 is formed with a seal rib 36 which also engages the trapezoidal shaped seal 15 when the door is closed, to complete the sealed door mode for the housing opening 14.

The downturned long and short flanges 33 and 34 of the cradle C have openings therein at the ends of flanges 33 and 34 spaced from the cradle flange 32 (FIG. 5) through which the pivotal connection 29 with the door frame flanges 18a is completed. Thus, the cradle C is pivoted on door frame F.

A central portion of the cradle bottom wall 30 is formed with a slight depression 37 (FIGS. 3, 5 and 8) from which a boss 38 projects. Bolt 39 having a head 40 is threaded into the boss 38 and normally the cradle C is biased on the pivotal connection 29 away from the door frame F (FIG. 5) by spring means 41 surrounding boss 38 and bolt 39 and extending between the recessed cradle depression 37 and the cross angle door frame member 19 of the door frame F.

A switch 42 having an actuator 43 is mounted on a flange 44 of cross angle door frame member 19. Switch 42 is normally closed (NC) for a purpose to be described below. Switch 42 is illustrated in normally closed position in FIG. 5 and in actuated open position in FIGS. 6, 7 and 8.

A cradle pocket is formed on the cradle bottom wall 30 extending generally upward from the top surface 45 of the cradle bottom wall 30 by a short flangelike pocket end wall 46, a long flangelike pocket end wall 47, a retainer wall 48 extending between the end walls 46 and 47 along the angular top portion of the trapezoidally shaped bottom wall 30, and a wall 49 semicircular in cross section extending from the portion of the cradle bottom wall 30 which is pivotally connected at 29 to the door frame F (FIG. 9).

The cradle pocket thus defined by the various walls extending upward from the cradle bottom wall 30 is best shown in FIG. 15. In this Figure, the retainer wall 48 is at the front or outer end of the cradle when the door is open as shown in FIG. 5 so that it retains a carrier indicated by dot-dash lines at 50 when a carrier 50 rolls down the cradle bottom wall 30 when the door F is opened. This retainer wall 48, may have an inner rounded contour in cross section indicated at 51 in FIGS. 9, 10, 11 and 15. The retainer wall 48 may be centrally notched or relieved at 52 to enable a customer to grasp a carrier 50 when removing it from the cradle C.

The short cradle pocket end wall 46 is formed with an opening 53 approximating in diameter the maximum diameter of the carrier 50 such as the diameter of the carrier wear rings, to permit a carrier to be delivered into the cradle C as described below. The semicircular cradle pocket wall portion 49 has an interior surface 54 having the same diameter as the diameter of the carrier entrance opening 53 and comprises an axial continuation of the opening 53 (FIG. 9). The long cradle pocket end wall 47 also is formed with an opening 55, coaxial with opening 53, a portion of which is formed on the same diameter as the inner diameter 54 of the curved wall portion 49 of which the opening 55 is an extension. Another portion 56 of the opening 55 is formed on a smaller diameter, also extending axially of the semicircular wall portion 49 and of the opening 53. The remainder of the opening 55 is formed with a radially projecting ear 57 for a purpose described below.

The cradle pocket retainer wall 48, as indicated, is located at the outer end of the cradle and door when the door is open as shown in FIG. 5, and wall 48 is located at the top of the cradle when the door is closed as shown in FIGS. 3 and 4. However, the semicircular cradle wall 49 is located at the inner end of the cradle when the door is in the open position of FIG. 5 and is located at the lower end of the cradle when the door is closed as shown in FIG. 9.

Figure 12:
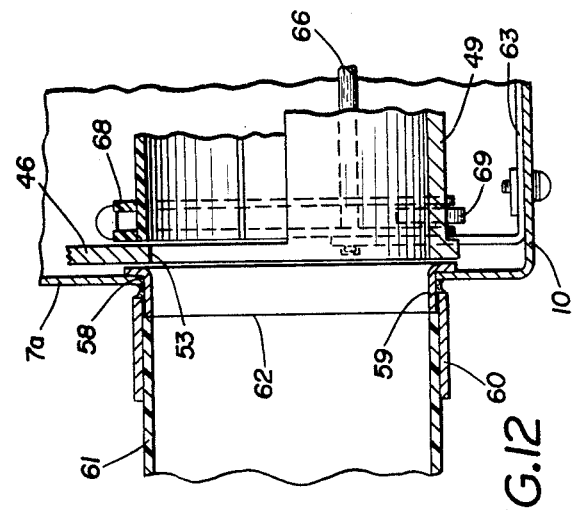
FIG. 12 is a fragmentary enlarged sectional view through one of the housing walls looking in the direction of the arrows 12—12, FIG. 9.

Referring to FIG. 12, which is a vertical sectional view taken on the axis of the circular inner surface 54 of the semicircular cradle wall portion 49, the housing lefthand side wall 7a is shown in cross section. The wall 7a is formed with an opening 58 having a flanged collar 59 extending therethrough with the collar flange engaged with the inner surface of the wall 7a. The collar 59 has an internal diameter the same as the outer diameter of the accelerator or wear rings on a typical carrier, such as the carrier shown in U.S. Pat. No. 3,787,008, which may be used in a pneumatic tube system served by the customer terminal 1.

Preferably a metal coupling ring band 60 surrounds and is adhesively connected with the outer surface of the collar 59 which projects outward from housing wall 7a. The coupling ring 60 projects beyond the collar, and an end of a pneumatic tube system tube 61, which connects the customer terminal 1 with a remote teller terminal T, is telescoped within the coupling ring 60 and adhesively connected or cemented thereto with its end abutting the end of the flanged collar 59 at 62. The wall thicknesses of the pneumatic tube 61 and of the collar 59 are the same so that each of the tube 61 and collar 59 have the same internal diameter which, as stated, is the same diameter as the diameter of the wear rings on a carrier 50 conveyed through the tube 61 and delivered to the terminal housing 5.

The axes of the carrier entrance opening 53 and of the semicircular inner surface 54 of the semicircular cradle wall portion 49 are aligned with the axis of the flanged collar 59 and of the end of the pneumatic tube 61 when the door F is closed, so that the semicircular cradle wall 49 is, in effect, a continuation of the lower half of the pneumatic tube 61 (FIG. 9).

A U-shaped bracket 63 with upwardly extending legs 64 is mounted within the housing 5 on the bottom wall 10 thereof near to the corner between the housing back wall 9 and side wall 7a (FIG. 9). A curved clamshell-like closure member, generally indicated at 65, is pivotally mounted at 66 on the bracket legs 64, normally biased to rotate counterclockwise around the pivot axis 66 by a spring 67 connected with the closure member 65 and one of the bracket legs 64.

The pivot mounting 66 of the clamshell-like closure member 65 is located intermediate the ends of two spaced curved arms 68 which form part of member 65. A roller 69 is journaled on the lower end of each arm 68 and a flanged stop bracket 70 engages the closure arms 68 between the pivot axis 66 and the roller 69 to limit clockwise movement of the closure member 65 viewing FIG. 9.

The upper curved portions 71 of the arms 68 are connected by a generally semicircularly curved wall 72 having an internal curved surface formed on a diameter approximating the diameter of the inner curved surface 54 of the cradle wall 49 so that when the door F and cradle are in the closed position of FIG. 9 the clamshell-like member 65 completes the formation of a tubular extension of the pneumatic tube 61. The clamshell-like member 65 is held in the position shown in FIG. 9 when the door F is closed by engagement of the rollers 69 with a humped cam surface 73 formed on the outer surface of cradle wall 49.

The length of the curved wall 72 of the closure member 65 in a direction extending axially of the cradle wall 49 is such that when a carrier 50 is delivered to the housing 5 and comes to rest therein with the door F in closed position (FIG. 9), the wear ring on the trailing end of the carrier will be located within the tubular extension of the pneumatic tube 61 provided by the cradle wall 49 and the clamshell-like closure member 65 as shown in FIG. 14 for a purpose described below.

Figure 13:
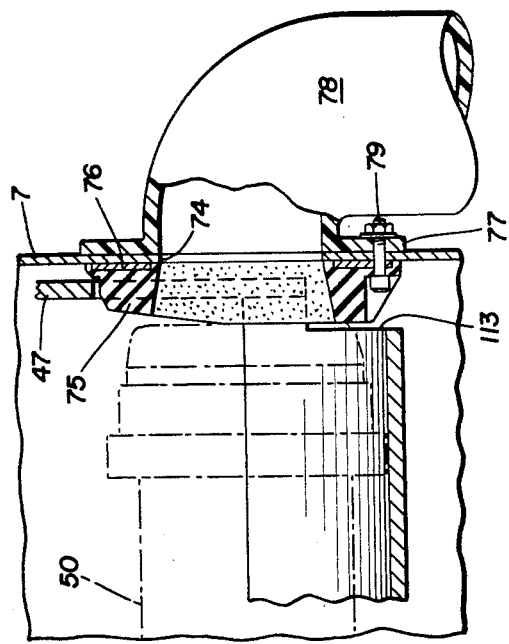
FIG. 13 is a fragmentary enlarged sectional view looking in the direction of the arrows 13—13, FIGS. 4 and 5 taken on a line passing through the same axial center line as that of the sectional view of FIG. 12.

Referring to FIG. 13, the housing side wall 7 is formed with an opening 74 axially aligned with but of smaller diameter than the opening 58 in side wall 7a. An annular bumper 75 formed of a suitable cushion material bonded to a metal washerlike ring 76 projects inward from and around the opening 74. The flanged end 77 of a pneumatic system tube 78 engages the outer surface of housing wall 7 and the members 75, 76 and 77 are securely clamped to the housing wall 7 by suitable bolt means 79. The pneumatic tube 78 provides an exhaust outlet when the interior of the housing 5 is under a pneumatic tube system pressure condition and provides an air intake for housing 5 when the housing is under a vacuum condition.

The shock absorbing bumper 75 has a cutout portion 80 (FIG. 9) in which the projecting ear 57 of cradle wall 47 is received. As shown in FIGS. 12, 13 and 14, the cradle pocket flangelike end walls 46 and 47 are located in planes perpendicular to the common axis of the cradle wall 49 and the openings 58 and 74 when the door F is in closed position. Further, the cradle end walls 46 and 47 also are located closely adjacent the housing walls 7a and 7, respectively.

In this manner, a carrier 50 when delivered to the housing 5 under pneumatic tube system suction arrives in the housing and is stopped by the shock absorbing bumper 75 preferably without striking the cradle pocket end wall 47, and carrier 50 is spaced from cradle wall 47 when the carrier comes to rest. Similarly, as stated, the wear ring 50a on the trailing end of an arriving carrier 50 in the cradle is engaged by the closure member 65 and the cradle wall 49 so that when the carrier 50 is replaced in such position following handling by a customer with the door F open, and the door F subsequently is closed, air pressure in housing 5 will drive the carrier 50 into the tube 61 to send the carrier 50 from the housing 5 to a teller terminal.

Since the common opening through the ringlike bumper 75, its mounting ring 76, the housing end wall opening 74 and the pneumatic tube 78 is smaller in diameter than the opening 58 in housing wall 7a, a carrier 50 cannot be moved out of the housing 5 at housing wall 7 because of its larger diameter than that of said common opening. The portion of cradle wall opening 55 having a diameter equal to the inner diameter 54 of cradle wall 49 permits most of bumper 75 to project into the cradle pocket and prevents a carrier from contacting cradle walll 47. When a user replaces a carrier in the cradle, the carrier could be pushed by the user through the large opening 55 and interfere with door closing movement. However, the ear formation 57 prevents a carrier from being pushed out of opening 55 at any time.

The cradle may be provided with an electric eye or infrared ray sensor light source in tubular socket 81 formed in the wall 49 of cradle C near to the cradle pocket end wall 47. Another socket 82 aligned with the socket 81 is formed in the cradle retainer wall 48 for mounting the sensor light receiver for the electric eye or infrared ray beam 81a projected from the socket 81. Thus, when the terminal unit is energized, a sensor ray 81a is projected from the socket 81 to the socket 82 which sensor ray is interrupted by an opaque portion of a carrier on the arrival of a carrier 50 in the cradle. The sensor ray is re-established upon sending a carrier 50 from the cradle C and housing 5.

The door F of the housing 5 is closed when a carrier 50 arrives in the housing and comes to rest in the position shown in FIGS. 13 and 14, the ends of the carrier being spaced from the cradle end walls 46 and 47. When door F is opened (FIG. 11), carrier 50 rolls down cradle C to the dot-dash position of FIG. 11 and the right end of the carrier finally engages the angled retainer wall 48 (FIG. 15a). Cradle wall 47 is parallel with wall 46 from the curved wall 49 to the zone 47a and the wall portion 47b is angled outwardly, indicated by the arrows 47c, to the zone 47d. This angled portion 47b prevents a carrier rolling in the cradle pocket from rubbing or hanging up on the cradle wall 47–47b in this zone.

In the angular carrier position of FIG. 15a, the carrier axis becomes parallel with the trapezoidal angular position of the cradle retainer wall 48, the righthand end of the carrier 50 being in the position indicated by the dot-dash outline of the carrier 50 in FIG. 5. Thus, the carrier 50 is in a very convenient position to be picked up by a customer carrying out a banking transaction. The cutout 52 in the retainer wall 48 permits the carrier 50 to be readily picked up.

If a customer has opened the carrier 50 to place something therein or to remove its contents, the carrier subsequently is replaced in the cradle C by the customer without having to orient the carrier in any required manner. When replaced, the carrier will roll to an angled position (FIG. 15a) again engaging retainer wall 48. Upon then closing the door C, the carrier rolls back along the cradle bottom wall 30 or drops to the position shown in FIG. 14, as the outer retainer wall 48 raises to closed position.

Thereafter, when the door F is fully closed, the rib 31 projecting from the cradle bottom wall 30 around three sides of the cradle and the angular flange 35 (FIG. 9) projecting from the lower surface of the cradle bottom wall 30 engages the endless seal member 15 surrounding the housing trapezoidal opening 14 and seals the door F and housing 5 against air leakage so that the pneumatic tube system can properly function when the door F is closed.

The outer surface of the door and cradle assembly preferably are enclosed with a protective cover of rubber or other similar soft yielding material. This may be accomplished by using a light sheet metal frame 83 having a generally trapezoidal shape with angular and side flanges 84 and 85, respectively, to which the rubber cover 86 (FIGS. 7, 8 and 9) is bonded. The frame 83 may be secured to the downturned cradle flanges 33 and 34 by screws 86a extending through the angular and side flanges 84 and 85 (FIG. 5).

The electric eye or infrared light beam sensor functions as arrival switch means for the unit to indicate the arrival of a carrier 50 in the housing 5. For this purpose, the electric eye sensor system 81–82 is connected in the electronic control system circuitry for the device in a usual manner and when the beam is interrupted by an opaque portion of a carrier arriving in the terminal 5, relays in the circuitry act to shut off the vacuum condition in the system and housing 5 and at the same time to energize the motor means 27 which rotates the shaft 26 in a clockwise direction (FIG. 4). Crank arm 25, in rotating, actuates link 23 to move angular end 20 of door pivot shaft 17 from the position of FIG. 4 to that of FIG. 5 thus opening the door.

When the door arrives at open position, a trip cam 87 fixed to pivot shaft 17 engages actuator 88 of normally closed motor control or limit switch 89 to open the switch thereby de-energizing and stopping door opening movement of the reversible motor 27. At this time the power supply connections for the motor 27 are reset to reverse the motor when again energized, and at the same time relays in the control system may reverse the air shifter for the pneumatic tube system so that when the air pump or blower is again energized, air under pressure will be delivered into the housing through pneumatic tube 78 rather than vacuum being supplied through tube 78 to deliver a carrier to the housing 5.

At the same time, the electric eye or infrared beam sensor switch means in the electronic control circuitry may be reversed so that the next time the beam is interrupted the pneumatic tube system pump will be started rather than stopped which stoppage occured upon the arrival of a carrier in the housing 5 as described.

When the door F is thus opened and the carrier moved from the cradle C by a customer, the infrared sensor beam is again established so that when the carrier is replaced in the cradle C, the beam is again interrupted and the door motor, which has been reversed, is energized, and the door F is closed upon counterclockwise movement of the drive shaft 26.

A spring 98 is connected with the pivot 22 between the angled end 20 of the door pivot shaft 17 and the link 23. This spring functions to assist the operation of the door motor 27 during door opening and closing movements. The spring 98 provides final pressure movement to each of the door open or door closed positions. The use of this spring to augment the force of the drive motor 27 permits the smallest drive motor to be used. Thus the spring 98 along with the motor 27 function to fully open or close the door F even though the door, cradle and carrier may be loaded to the maximum load factor for which the equipment is designed.

Figure 18:
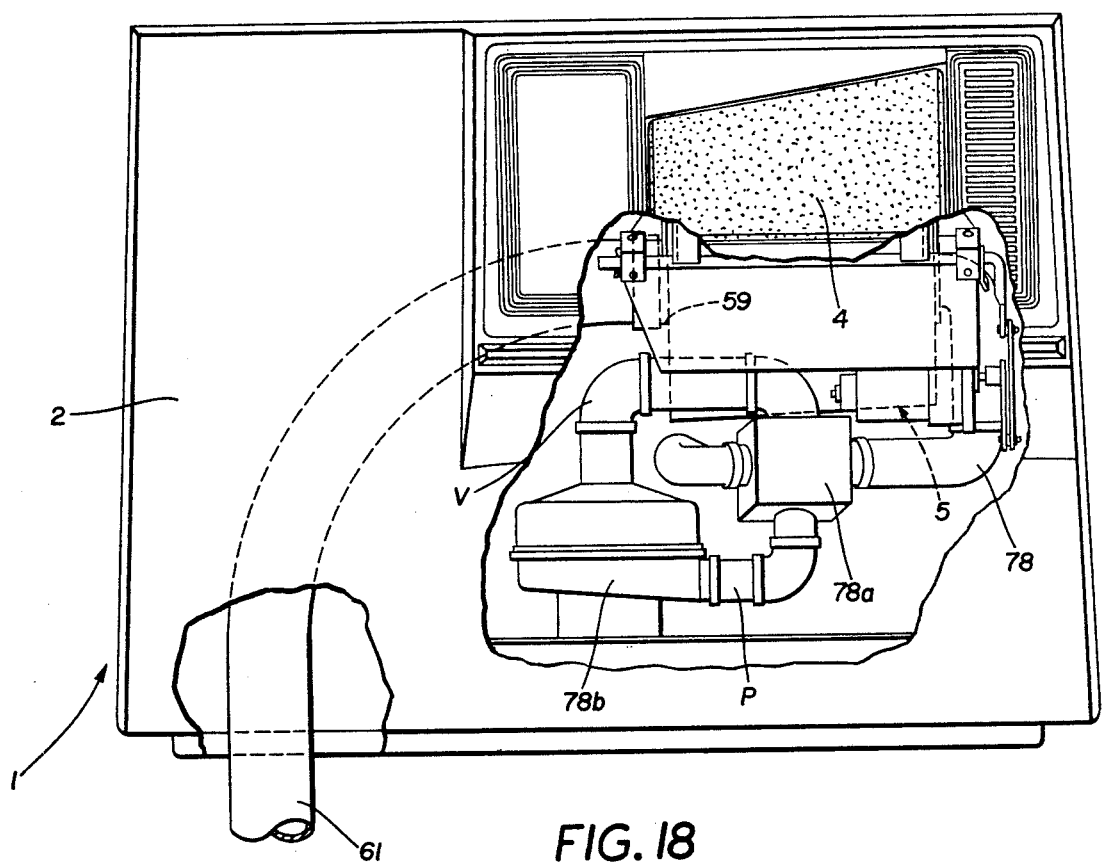
FIG. 18 is a view similar to FIG. 1 with parts broken away, showing the system blower and air shifter housed within the customer terminal cabinet.
Figure 17:
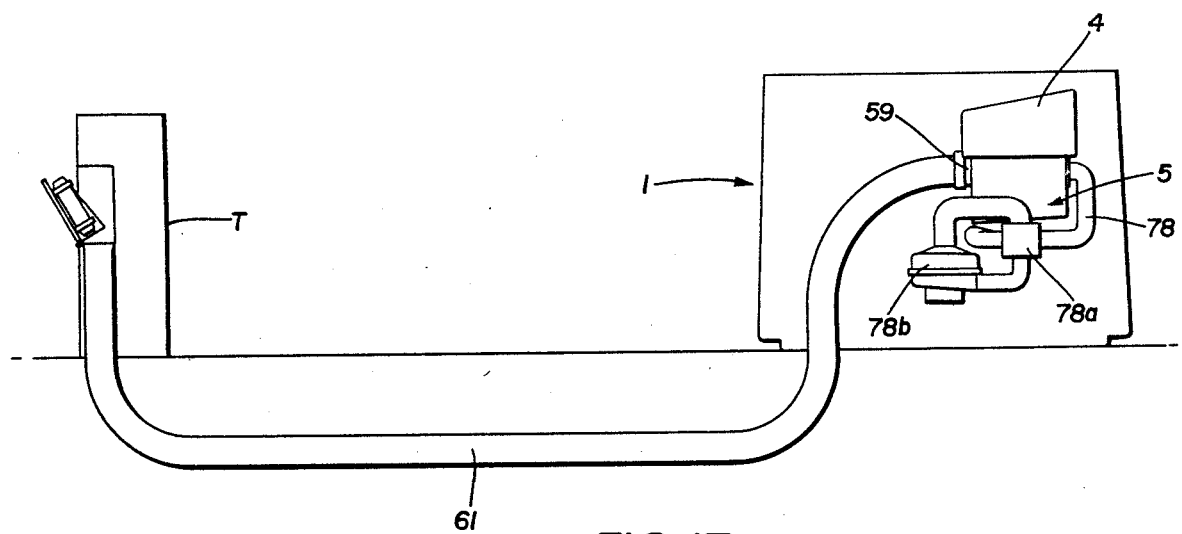
FIG. 17 is a diagrammatic view of a pneumatic tube system equipped with the new customer terminal construction.

As indicated in FIGS. 17 and 18, the air shifter 78a and air pump or blower 78b referred to are components commonly used in pneumatic tube systems. Such components may be housed in the cabinet 2 (FIG. 18) wherein a vacuum connection V and a pressure connection P may extend between the blower 78b and air shifter 78a. The air shifter 78a is connected by pneumatic tube 78 with the terminal housing 5 for supplying pressure or vacuum to the terminal housing 5. Such blowers and air shifters may be of known construction such as illustrated in U.S. Pat. Nos. 4,059,246 and 3,232,559.

As shown in FIG. 17, the pneumatic tube system conveyor tube 61 coupled with the flanged collar 59 mounted on the housing side wall 7a extends to a teller terminal T located within a bank building, a customer at customer terminal 1 preferably being visible by a teller at teller terminal T.

The control system circuitry also includes a pair of switches 90 and 91 mounted on the housing wall 7 near to the top wall 8 and to the housing opening 14 in the front wall 6 (FIGS. 4 and 5). The switch actuators 92 and 93, respectively for switches 90 and 91, are controlled for operation by a barrel cam tripper 94 which engages the switch actuators alternately or successively. As shown in FIG. 5, the barrel cam 94 is biased by spring 95 to the left to project its plunger end portion 96 through an opening 97 in the housing front wall flange portion 11.

In the position shown in FIG. 5 with the door F open, the barrel cam 94 holds switch 90 in one position and cam 94 does not engage the actuator 93 of switch 91. Switch 90 is in the control circuitry with (NC) switch 42 as a safety control switch for a purpose to be described below.

As the upper edge of the door assembly F reaches approximately ½" from full closed position, it engages the end plunger 96 of barrel cam 94 and moves the barrel to the right against the pressure of spring 95. The cam barrel 94 thus disengages the actuator 92 of safety control switch 90 permitting switch 90 to be actuated and thereby to control the circuit to door switch 42. As the door becomes completely closed as shown in FIG. 4, the cam barrel 94 engages the actuator 93 of switch 91 to actuate switch 91.

In the fully closed position, the door F is sealed to the housing and actuating door closed switch 91 energizes or enables the blower to supply air from the air shifter under pressure to pneumatic tube 78 to discharge into the pneumatic tube system tube 61 a carrier located in the cradle C. At the same time that the switch 91 is activated to energize or enable the blower, relays in the control circuitry de-energize or disable the drive motor 27 which has operated to close the door F.

In this manner, the switches 90 and 91 controlled by the near approach of the door to fully closed position prevent air pressure from being applied to the interior of the housing 5 until the door is fully closed and the housing sealed; and, as the door is nearly closed, the safety control of the door is cancelled as described below.

The cradle bottom wall 30, which is pivotally mounted at 29 on the door F, in normal position, is pushed away from the door end members 18 by the spring 41 as shown in FIG. 5. Further movement of cradle away from member 18 is restrained by the head 40 of bolt 39 engaging the door cross-angle member 19. In this normal position of the cradle C and door F, as shown in FIG. 5, the actuator 43 of normally closed door switch 42 does not contact the cradle bottom wall center depression portion 37.

An external obstacle of any kind encountered in the path of cradle-door assembly travel during closing from open position to within approximately ½" from full closed position as stated above which provides resistance of a predetermined amount moves the cradle wall 30 in the direction of the arrow 100 superimposed on the bolt 39 in FIG. 8, and compresses the spring 41. Such obstacle may be a finger 99.

During such relative cradle movement toward the door frame, the actuator 43 of door switch 42 engages depressed portion 37 of cradle wall 30 to actuate switch 42. Such switch actuation results in relays in the control circuitry reversing movement of the drive motor 27 to stop closing movement of the door and prevent injury to the operator at 99. Reversing the motor 27 provides opening movement of the door until it opens fully. Meanwhile, the finger or projection that was pinched may be withdrawn.

When the door reaches fully open position, the control circuitry does not recognize anything but that the door has come to fully open position, so the drive motor is stopped through operation of limit switch 89 as previously described. In order to close the door, the carrier 50 must be lifted from the cradle C, to simulate normal operation, and then replaced, in order to establish the safety infrared ray sensor condition and then interrupt the ray to automatically pick up the control sequence as previously described so that upon replacing the carrier 50 the motor 27 is energized and drives the door to closed position unless again interrupted by pinching some interfering object between the door and housing.

The described safety feature operates throughout at any time during door closing movement from fully open position to within $\frac{1}{2}''$ of being fully closed.

Referring to FIG. 7, the safety feature just described involving relative movement of the cradle toward the door to actuate switch 42, has a second important operative function as shown in FIG. 7. Situations can occur in the operation of pneumatic tube systems to carry out banking operations wherein a customer may overload a carrier 50, for example, by filling the carrier with a greater weight of coin than the system is designed to accept. Under such overloaded conditions, a carrier filled with too great a weight of coin can become stopped or trapped someplace in the system and require major repairs to locate or dislodge the carrier.

In order to prevent introducing into the system a carrier having a load therein in excess of the maximum weight for which the pneumatic system is designed, the normal spring pressure exerted by the spring 41 is designed so that a carrier 50 containing an overload will provide a downwardly directed force, indicated by the arrow 101, which compresses the spring 41 and results in the switch actuator 43 engaging the cradle bottom wall as shown in FIG. 7 tripping switch 42. This actuation of switch 42 results in nothing further happening by the interruption of the normal sequence of operations. No movement of the door can occur until the overloaded carrier 50 is removed, when the normal sequence will resume when a properly loaded carrier is replaced.

As previously discussed, the connection of switch 90 with the door switch 42, which switch 90 is actuated by actuating plunger 96 when the door reaches within less than $\frac{1}{2}''$ of full closing, permits the full closing and sealing of the door and prevents triggering reversal of door movement as the door fully closes and is sealed by engagement of the cradle ribs 31 with the door frame seal gasket 15, which of course causes relative movement of the cradle toward the door frame. This seal seating, except for operation of switch 90, would otherwise cause the door assembly to again open.

The inside surface of the curved wall 72 of the clamshell-like closure member 65 is provided near the free or open edge of the member 72 with an inwardly projecting axially extending locating strip or runner 102. The strip 102 engages one of the wear rings 50a of a carrier to locate such carrier, on arriving within the housing 5, properly seated on the inside surface 54 of the curved pocket wall 49 of the cradle C. Manufacturing tolerances in the sizes of or assembly of various components including the pivoted cradle C, the pivoted clamshell-like closure member 65, the trueness of the circular shape of the pneumatic tube 61, looseness in pivot mountings, the adjustment of stop bracket 70, etc., may result in the tubular extension of pneumatic tube 61 provided by cradle wall 49 and chamber wall 72 being slightly enlarged, or being out of round. This can sometimes result in a carrier being delivered to the housing 5 in a high position, or slightly canted, or out of axial alignment, so that it may be wedged slightly against the curved wall 72 of the closure member 65. If this condition occurs, a carrier wedged against the free edge of the member 72 may prevent opening movement of the door assembly F.

To avoid such operating difficulties the strip or runner projection 102 provided on the inside of curved wall 72 forces a carrier downward with its axis aligned with the axis of the carrier entrance opening 53 in the cradle wall 46.

During use of the equipment when the carrier 50 has been replaced by a user in the open cradle C and the door assembly F is closed, the carrier C rolls along the cradle bottom wall 30 to the semicircular cradle wall 49 where it comes to rest at a position oriented axially of the cradle wall 49, such as shown in FIG. 14. The right end of the carrier 50 may be spaced from the cradle end wall 47. The other carrier end also will be clear of contact with the cradle end wall 46 because of being axially aligned, by the cradle curved wall 49, with the carrier entrance opening 53 located in cradle end wall 46. Such carrier position is represented by the dot-dash outline of the carrier 50 in FIG. 14.

In the stated position, the lefthand carrier wear ring 50a is in contact substantially entirely circumferentially with the semicircular cradle wall 49 and the curved wall 72 of clamshell-like closure member 65 (FIG. 9). In this manner when the interior of housing 5 is supplied with pneumatic tube system pressure, the carrier 50 is discharged from the housing into pneumatic tube 61.

Figure 11:
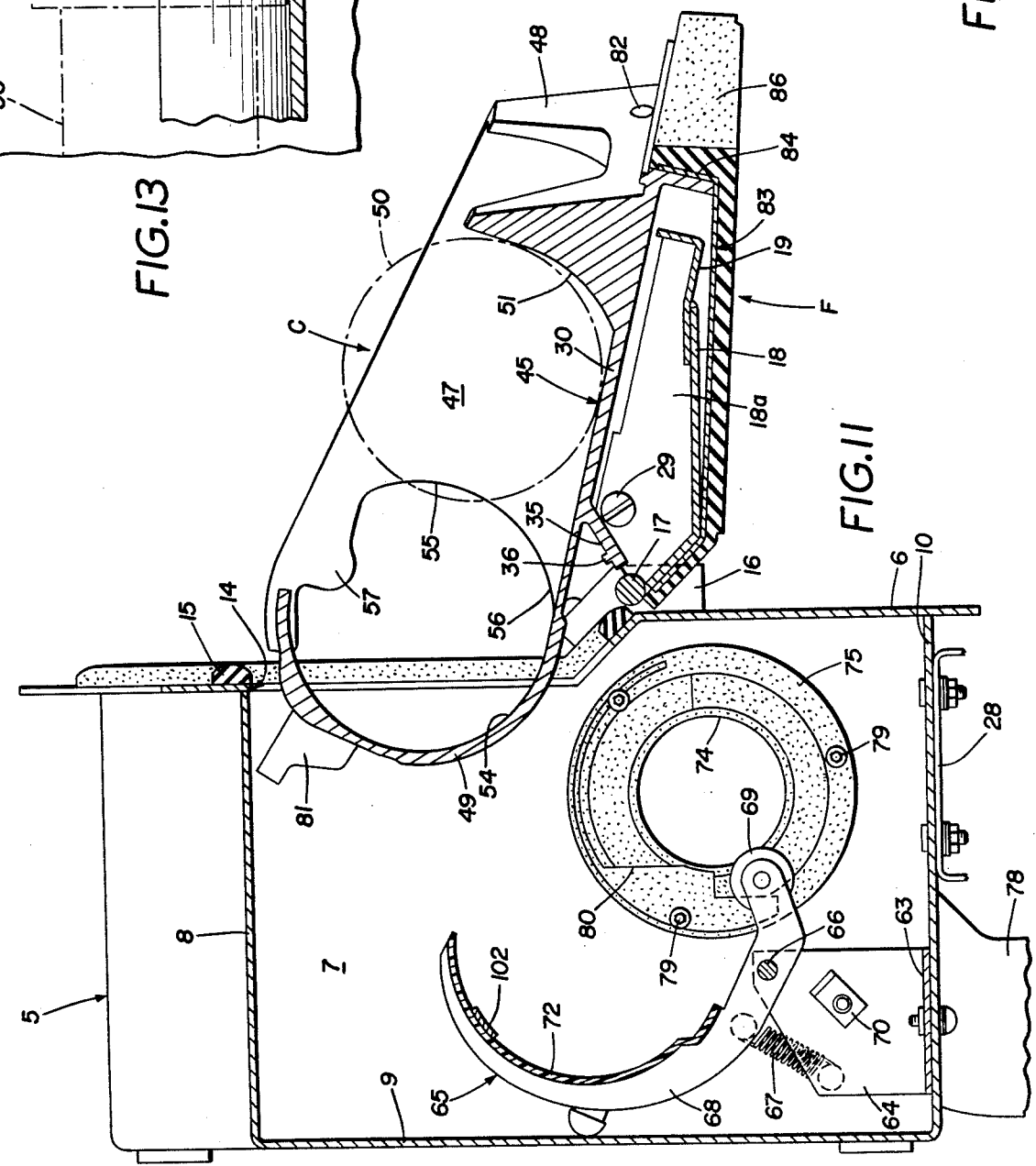
FIG. 11 is a view similar to FIGS. 9 and 10 showing the final position of the mechanism components when the housing door has been completely opened.

FIGS. 9, 10 and 11 show the sequence of movements of the various components when the door F is moved from the closed position of FIG. 9 to the open position of FIG. 11. The sequence of movements thus shown indicate the manner in which the clamshell-like closure member 65, which completely encloses the trailing end of a carrier 50 which has arrived in the terminal 1, opens up immediately as the door F starts to open (FIG. 10). This results because rollers 69 roll off of cam bump 73 as the portion of the cradle located below the door pivot shaft 17 moves upward since the cradle rotates around pivot shaft 17. Such upward cradle movement quickly releases contact of the cradle wall 49 with rollers 69, permitting the clamshell-like closure member 65 to move, biased by spring 67, to the fully open position shown in FIG. 11 before the door F has reached the fully open position also shown.

During closing of the door assembly F, the reverse sequence of movements of the components occurs and the clamshell-like closure member 65 does not start to close until the cradle wall 49 engages the rollers 69 during final door closing movement.

The described operations and sequence of movements of the components of the mechanism which occur when a carrier 50 arrives by pneumatic tube system vacuum within the housing 5 of the customer terminal, during opening of the door assembly, and, after replacement of a carrier 50 in the cradle C, during closing of the door assembly F, thus provide complete automatic operation of the mechanism at every stage.

The operation and use of the improved customer terminal 1 for carrying out a normal banking operation is summarized below.

A customer drives up to the terminal 1 and a teller, having visual communication noting the arrival of a customer, or when signaled by the customer, presses a button at the teller terminal T to activate the system. An empty carrier 50 is sent from the teller terminal to the customer terminal and the door assembly F opens, the activated infrared sensor control ray beam 81a sensing the carrier arrival within the housing 5.

When the door assembly F opens, the carrier 50 rolls to the position shown in FIGS. 5 and 11, and the customer may remove the carrier 50 from the cradle C and place banking transaction material in the carrier. The customer then replaces the carrier in cradle C and the door assembly F automatically closes. Then the carrier is automatically sent to the remote teller terminal where necessary banking transaction operations are performed.

The teller then returns to the customer terminal the carrier 50 containing material completing the transaction. Upon arrival of the carrier at the customer terminal the door assembly F automatically opens to permit the customer to remove banking transaction material from the carrier. The carrier 50 then is replaced in the cradle and the door assembly automatically closes. The carrier 50 then is automatically returned to the teller terminal; and the system is ready to serve the next request for banking services.

Figures 2, 16:
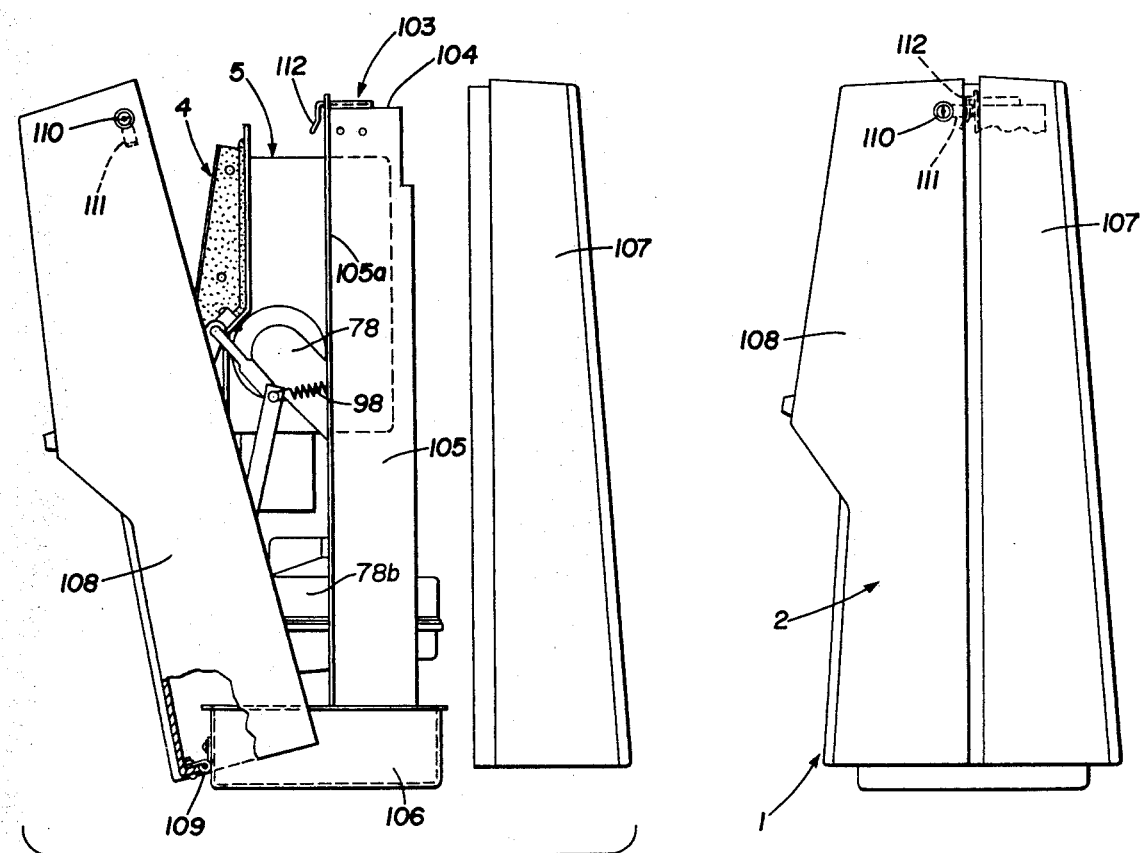
FIG. 2 is an end elevation of the terminal shown in FIG. 1.
FIG. 16 is a diagrammatic partially exploded view similar to FIG. 2 showing the terminal cabinet portions removed or open to illustrate the mechanism mounting frame contained therein.

An important aspect of the new customer terminal construction 1 is the manner in which the mechanism is mounted and housed within the cabinet 2. The cabinet includes an inner frame generally indicated at 103 formed by a top cross or stretcher member 104, column or strut side members 105 and a bottom stretcher or base member 106. The mechanism housing 5 may be mounted in any suitable manner within the frame 103. Pneumatic system tubes connected with the housing 5, the air shifter 78a and blower 78b also may be mounted in frame 103, as shown diagrammatically in FIGS. 16, 17 and 18.

A rear cabinet enclosure 107 may be suitably bolted (not shown) to flanges 105a on the frame strut members 105. Such bolting is accessible when the front of the cabinet is open. A front cabinet enclosure 108 is pivotally mounted at 109 to a lower portion of the base member 106. The pivot connection 109 may be released when front enclosure 108 is opened to the position shown in FIG. 16, so that the front cabinet enclosure member 108 can be completely removed from the frame 103. Front enclosure 108 may be provided with a lock 110 having a bolt indicated at 111 which may be engaged with a bracket 112 mounted on the frame 103, when front cabinet member 108 is in the closed position of FIG. 2.

The described terminal cabinet and frame construction provides for ready and complete accessibility of all components of the terminal mechanism for repairs, adjustment, replacement of parts, etc., without the necessity of tearing down the terminal mechanism, which has characterized prior art pneumatic tube system remote or customer terminals.

Another aspect of the new terminal construction of the invention involves the coordinated relationship between the transfer cradle, the terminal housing 5, the door for the housing opening, the stop bumper within the housing and the single pneumatic system conveyor tube. The cradle is pivotally mounted on the door on a pivot axis spaced from the pivot mounting of the door on the housing but parallel thereto. The axes of these pivot mountings both are parallel with the axis, preferably horizontal, of the pneumatic system conveyor tube at the location where it is connected with the housing.

The cradle and door assembly have a trapezoidal shape so that the outer wall of the cradle pocket may be angled to transfer a carrier to an angled position for being removed from or replaced in the cradle pocket outside of the housing by a user when the door is opened.

A further interrelationship involves the provision of the bumper in the housing in axial alignment with the pneumatic system conveyor tube. The bumper must project into the cradle pocket to avoid a carrier striking a cradle pocket wall forcefully or stopping in contact with such wall. This could prevent the carrier from rolling in the cradle pocket to the transferred position.

The bumper must project into the cradle pocket. This bumper projection, however, must not provide an obstacle to pivot movement of the cradle between closed and opened positions. This problem of providing against interference between bumper and cradle is solved by cutting back a portion of the cradle walls 49 and 47, as indicated at 113 (FIGS. 13 to 15) in a zone where said walls 49 and 47 otherwise would be connected. This cutback 113 in the cradle structure and the bumper cutout portion 80 (FIGS. 9 to 11) permit the cradle to pivotally move across the bumper, which projects into the cradle pocket, when the door is being closed or opened.

The new concepts of the various new pneumatic tube system customer terminal features or constructions thus provide a customer transfer station for a pneumatic tube conveyor system having a cradle mechanism to facilitate transfer of a carrier to and from the pneumatic system conveyor tube and a carrier presentation location readily accessible to a motorist seated in an automobile or other similar vehicle.

The cradle mechanism involves the cradle-door assembly pivotally connected to each other and separately, pivotally mounted on a housing to form a closure for an opening in the housing. The cradle has a trapezoidally shaped pocket provided with a cylindrical wall portion aligned with the tube system conveyor tube when the cradle and door assembly is closed. A clamshell-like or curved closure member is separately, pivotally mounted in the housing and movable to mate with the cradle cylindrical wall portion to form an extension of the pneumatic system conveyor tube.

This closure member is biased to move out of the path of movement of the cradle as the cradle moves from closed to open position; and said closure member is engaged by the cradle to complete the conveyor tube extension as the cradle moves from open to closed position.

The cradle has a ramplike wall forming the cradle pocket bottom wall along which a carrier rolls from one location to another in the pocket as the cradle is moved between opened and closed positions.

The separate door, cradle, and closure member pivotal axes are spaced from one another, parallel with each other, and all are parallel with the preferably horizontal axis of the connection of the pneumatic system conveyor tube with the housing.

The outer pocket wall of the trapezoidally shaped cradle, angled with respect to the horizontal axis of the pneumatic system conveyor tube, presents a carrier, when the cradle is in open position, in a most convenient position for manipulation by a customer removing or replacing the carrier from or to the cradle without requiring precise positioning.

The control circuitry is simplified since power supply for and activation and deactivation of the blower, the air shifter, the motor drive for the cradle-door assembly, and the door safety device, may be accomplished by simple known switch and switch control circuitry free from timers, rectifiers, etc. This control circuitry may involve a low voltage system and, thus, wiring and wiring protection is simplified as well known in the art.

Accordingly, the concepts of various aspects of the invention described in detail provide a new pneumatic tube banking system terminal construction having cooperatively arranged components and a simplified mode of operation which achieve the stated objectives, eliminate difficulties arising with prior devices, and solve problems and obtain the described new results.

In the foregoing description, certain terms have been used for brevity, clearness and understanding; but not unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the terminal equipment and mechanism thereof is constructed and operated, and the advantageous, new and useful results obtained; the new and useful structures, devices, elements, arrangements, parts, combinations and cooperative relationships are set forth in the appended claims.

I claim:

1. In a single conveyor tube banking service pneumatic tube system of a type having a conveyor tube extending between a teller terminal and a remote customer terminal supplied with vacuum or pressure from system blower and air shifter units to transport a carrier between such terminals; the improvement in which the customer terminal includes:
   (1) walls forming a terminal housing, and an access opening formed in one of the housing walls;
   (2) means connecting a horizontally extending axis end of a system conveyor tube to an opening in another housing wall;
   (3) a door, a cradle pivotally mounted on the door on a horizontal axis, the cradle-door assembly being pivotally mounted on the housing on a horizontal axis spaced from and parallel with both the cradle pivot axis and the conveyor tube axis to form a closure for the access opening movable between closed and open positions;
   (4) the cradle having a bottom ramp wall, and having first and second spaced side walls and first and second spaced end walls projecting from the bottom ramp wall to form a cradle pocket on said ramp wall, said first side wall being located adjacent the cradle pivot axis and having a semicircular shape in cross section formed on an axis coinciding with the conveyor tube axis when the cradle-door assembly is closed, said cradle end walls being perpendicular to said semicircular side wall axis, a circular carrier entrance opening formed in said first cradle end wall on a center lying in the coinciding semicircular wall and conveyor tube axes when the cradle-door assembly is closed, and an opening of reduced size with respect to said carrier entrance opening formed in said second cradle end wall aligned with said carrier entrance opening;
   (5) a clamshell-like closure member pivotally mounted in said housing having a generally semicircular wall extending in one direction from said pivot mounting and having an internal curved surface formed on a diameter approximating that of the inner surface curvature of said semicircular cradle side wall, the closure member pivot mounting being spaced from but parallel with the cradle-door assembly pivot axis, said closure member having a portion extending in a second direction from said pivot mounting engaging said semicircular cradle wall when the cradle-door assembly is closed, holding said closure member in position to complete the formation inside the housing of a tubular extension of said conveyor tube, and means biasing said closure member away from said tube extending position when the cradle is disengaged from the closure member during opening movement of said cradle-door assembly;
   (6) power means for moving the cradle-door assembly between open and closed positions;
   (7) the cradle ramp wall extending downwardly at an angle with respect to the horizontal from said access opening when the cradle-door assembly is in open position;
   (8) a carrier discharged from the conveyor tube through said carrier entrance opening into the cradle pocket when the cradle-door assembly is in closed position rolling along said ramp wall in said pocket to said second side wall when the cradle-door assembly is moved from closed to open position;
   (9) said second pocket side wall acting as a carrier retainer wall when cradle-door assembly is in open position; and
   (10) a carrier when placed in said cradle pocket resting against said retainer wall when the cradle-door assembly is in open position rolling along said ramp wall to said semicircular cradle side wall as the cradle-door assembly is moved from open to closed position.

2. The construction defined in claim 1 in which a vacuum conveyed carrier delivered by the conveyor tube to said cradle when the cradle-door assembly is closed, is automatically presented at the cradle pocket retainer wall outside the housing.

3. The construction defined in claim 2 in which the automatic presentation outside of the housing of a carrier delivered to said cradle is enabled by switch sensor means provided on the cradle actuated by delivery of said carrier to said cradle to disable the blower-induced system vacuum and to enable power means movement of the cradle-door assembly to open position, whereby such carrier rolls in said cradle pocket to said cradle pocket retainer wall.

4. The construction defined in claim 3 in which limit switch means is provided on the housing engaged by the cradle-door assembly upon arrival at open position to stop power means movement of said assembly, to reset said power means for reverse movement when next energized, and to reverse the air shifter unit to provide system pressure when the blower unit is next energized.

5. The construction defined in claim 4 in which a carrier presented outside of the housing at said pocket retaining wall when removed from the cradle and then replaced in the cradle pocket actuates the switch sensor means to enable power means movement of the cradle-door assembly from open to closed position; in which door closed switch means is provided on the housing actuated by the cradle-door assembly upon arrival at closed position to stop further power means closing movement of said assembly, and to enable system blower and air shifter units to supply system pressure to the closed housing; in which said carrier rolls to engage said cradle semicircular side wall during cradle-door assembly closing; and in which a wear ring of such carrier is engaged in said tubular conveyor tube extension formed by said semicircular cradle wall and said semicircular closure member wall when said cradle-door assembly is in closed position, whereby such carrier is sent into the conveyor tube from said cradle by system pressure established in said housing.

6. The construction defined in claim 2 in which a carrier deposited into said cradle pocket when the cradle-door assembly is in open position, closes the cradle-door assembly and is sent from the cradle into the conveyor tube automatically upon such carrier deposit.

7. The construction defined in claim 1 in which the cradle-door assembly is provided with a door safety switch; and in which when said cradle-door assembly encounters an obstacle during power means closing movement, the door safety switch is triggered to reverse power means movement to move the cradle-door assembly to open position.

8. The construction defined in claim 7 in which safety control switch means is provided on the housing engaged by the cradle-door assembly as the latter approaches fully closed position to disable said door safety switch.

9. The construction defined in claim 1 in which the cradle-door assembly is provided with a door safety switch; and in which when said cradle-door assembly is in open position and a carrier is deposited in the cradle containing a load in excess of a predetermined amount, the door safety switch is triggered to disable power means operation of said assembly.

10. The construction defined in claim 1 in which the housing is provided with continuous compressible seal means surrounding said access opening; and in which said cradle bottom ramp wall is provided with seal rib means engaging said compressible seal means to pneumatically seal the housing when the cradle-door assembly is moved to fully closed position.

11. The construction defined in claim 1 in which switch sensor means is provided on the cradle; in which a carrier presented on an opened cradle-door assembly outside of the housing at said pocket retaining wall when removed from the cradle and then replaced in the cradle pocket actuates said switch sensor means to enable power means movement of the cradle-door assembly from open to closed position; in which door closed switch means is provided on the housing actuated by the cradle-door assembly upon arrival at closed position to stop further power means closing movement of said assembly, and to enable system blower and air shifter units to supply system pressure to the closed housing; in which said carrier rolls to engage said cradle semicircular side wall during cradle-door assembly closing; and in which a wear ring of such carrier is engaged in said tubular conveyor tube extension formed by said semicircular cradle wall and said semicircular closure member wall when said cradle-door assembly is in closed position, whereby such carrier is sent into the conveyor tube from said cradle by system pressure established in said housing.

12. The construction defined in claim 1 in which a bumper opening is formed in a housing wall opposite the housing wall to which the conveyor tube is connected; in which said bumper opening is smaller than but axially aligned with said conveyor tube connected opening; in which a ringlike shock absorbing bumper is mounted inside of the housing aligned with said bumper opening; in which a cutout is formed in said bumper; in which portions of the semicircular cradle wall and of said second cradle end wall are cut away in the zone of said second cradle end wall reduced size opening; in which an inward radially projecting ear forms part of said reduced size opening; and in which said ear moves in and out of said bumper cutout and the cradle cutaway portions clear the ringlike bumper as the cradle-door assembly moves between open and closed positions.

13. The construction defined in claim 12 in which a pneumatic tube system outlet tube is connected with said bumper opening; and in which said outlet tube is connected with system blower and air shifter units for supplying vacuum or pressure to the housing when the cradle-door assembly is in closed position.

14. The construction defined in claim 13 in which said first and second cradle end walls are parallel to and extend closely adjacent to the housing walls in which the conveyor tube connected opening and bumper opening, respectively, are formed.

15. The construction defined in claim 1 in which a protective cover of soft, yielding material bonded to a flanged sheet metal frame is secured to flanges extending from the underside of the cradle ramp wall to enclose the cradle-door assembly.

16. The construction defined in claim 1 in which the outer surface of the semicircular cradle wall is formed with an axially extending humplike cam surface; and in which the second-direction-extending portion of the closure member engages said humplike cam to hold said closure member in tubular extension-forming position when the cradle-door assembly is closed.

17. The construction defined in claim 16 in which the second-direction-extending closure portion has rollers mounted thereon which engage said humplike cradle cam when the cradle-door assembly is closed and which roll along said semicircular cradle wall surface until disengagement or after engagement, respectively, during opening and closing movements of the cradle-door assembly.

18. The construction defined in claim 1 in which an inwardly projecting axially extending runner is formed on the inside surface of said semicircular wall portion of said closure member to locate a carrier arriving in the cradle with the carrier axis aligned with the axis of the carrier entrance opening formed in said first cradle end wall.

19. The construction defined in claim 1 in which the housing access opening has a trapezoidal shape; in which the cradle-door assembly has a trapezoidal shape slightly larger than that of the access opening; in which continuous compressible seal means is mounted exteriorly on the housing surrounding said trapezoidally shaped access opening; and in which said cradle-door assembly is provided with seal rib means engaging said compressible seal means entirely around the trapezoidal access opening to pneumatically seal the housing when the cradle-door assembly is moved to fully closed position.

20. The construction defined in claim 19 in which an opening is formed in a housing wall opposite the housing wall to which the conveyor tube is connected; in which a pneumatic tube system outlet tube is connected with said opposite housing wall opening; and in which said outlet tube is connected with system blower and air shifter units for supplying vacuum or pressure to the housing when the cradle-door assembly is in closed position in sealing engagement with the housing wall wherein the access opening is formed.

21. The construction defined in claim 1 in which the door comprises a door frame formed by a pivot shaft, spaced end members and a cross member spaced from the pivot shaft, said door frame pivot shaft, end and cross members being rigidly joined together; in which said pivot shaft is a part of the pivotal mounting of the cradle-door assembly on the housing; and in which the pivotal mounting of the cradle on the door is located intermediate said pivot shaft and said door frame cross member.

22. The construction defined in claim 21 in which the housing access opening has a trapezoidal shape; in which the cradle has a trapezoidal shape defining the cradle-door assembly trapezoidal shape; in which the cradle trapezoidal shape is slightly larger than that of the access opening; and in which said cradle retainer wall extends at an angle, defined by said trapezoidal shape, with respect to the axis of the pivot mounting of the cradle on the door.

23. The construction defined in claim 22 in which continuous compressible seal means is mounted exteriorly on the housing surrounding said trapezoidally shaped access opening; and in which said cradle-door assembly is provided with seal rib means engaging said compressible seal means entirely around the trapezoidal access opening to pneumatically seal the housing when the cradle-door assembly is moved to fully closed position.

24. The construction defined in claim 23 in which an opening is formed in a housing wall opposite the housing wall to which the conveyor tube is connected; in which a pneumatic tube system outlet tube is connected with said opposite housing wall opening; and in which said outlet tube is connected with system blower and air shifter units for supplying vacuum or pressure to the housing when the cradle-door assembly is in closed position in sealing engagement with the housing wall wherein the access opening is formed.

25. The construction defined in claim 24 in which a vacuum conveyed carrier delivered by the conveyor tube to said cradle when the cradle-door assembly is closed, is automatically presented at the cradle pocket angled retainer wall outside the housing.

26. The construction defined in claim 25 in which a carrier deposited into said cradle pocket retained by said angled retainer wall when the cradle-door assembly is in open position, closes the cradle-door assembly and is sent from the cradle into the conveyor tube automatically upon such carrier deposit into said cradle pocket.

27. The construction defined in claim 26 in which a door safety switch is mounted on said door frame cross member; and in which when said cradle-door assembly encounters an obstacle during power means closing movement, said door safety switch is triggered, by pivotal movement of the cradle on said door frame towards the door, to actuate said door safety switch, thereby reversing power means movement of the cradle-door assembly to move said assembly to open position.

28. The construction defined in claim 27 in which safety control switch means is provided on the housing engaged by the cradle-door assembly as the latter approaches fully closed position to disable said door safety switch.

29. The construction defined in claim 25 in which the automatic presentation outside of the housing of a carrier delivered to said cradle is enabled by switch sensor means provided on the cradle actuated by delivery of said carrier to said cradle to disable the blower-induced system vacuum and to enable power means movement of the cradle-door assembly to open position, whereby such carrier rolls in said cradle pocket to said cradle pocket angled retainer wall.

30. The construction defined in claim 29 in which limit switch means is provided on the housing engaged by the cradle-door assembly upon arrival at open position to stop power means movement of said assembly, to reset said power means for reverse movement when next energized, and to reverse the air shifter unit to provide system pressure when the blower unit is next energized.

31. The construction defined in claim 30 in which a carrier presented outside of the housing at said pocket angled retainer wall when removed from the cradle and then replaced in the cradle pocket actuates the switch sensor means to enable power means movment of the cradle-door assembly from open to closed position; in which door closed switch means is provided on the housing actuated by the cradle-door assembly upon arrival at closed position to stop further power means closing movement of said assembly, and to enable system blower and air shifter units to supply system pressure to the closed housing; in which said carrier rolls to engage said cradle semicircular side wall during cradledoor assembly closing; and in which a wear ring of such carrier is engaged in said tubular conveyor tube extension formed by said semicircular cradle wall and said semicircular closure member wall when said cradle-door assembly is in closed position, whereby such carrier is sent into the conveyor tube from said cradle by system pressure established in said housing.

32. The construction defined in claim 22 in which a bumper opening is formed in a housing wall opposite the housing wall to which the conveyor tube is connected; in which said bumper opening is smaller than but axially aligned with said conveyor tube connected opening; in which a ringlike shock absorbing bumper is mounted inside of the housing aligned with said bumper opening; in which a cutout is formed in said bumper; in which portions of the semicircular cradle wall and of said second cradle end wall are cut away in the zone of said second cradle end wall reduced size opening; in which an inward radially projecting ear forms part of said reduced size opening; and in which said ear moves in and out of said bumper cutout and the cradle cutaway portions clear the ringlike bumper as the cradle-door assembly moves between open and closed positions.

33. The construction defined in claim 32 in which a protective cover of a soft, yielding material bonded to a flanged sheet metal frame trapezoidal in shape is secured to flanges extending from the underside of the cradle ramp wall to enclose the trapezoidal-shaped cradle-door assembly.

34. The construction defined in claim 1 in which the customer terminal includes a cabinet; in which the cabinet has a frame formed by a top stretcher member, spaced side strut members and a bottom base member all joined together; in which said housing and system blower and air shifter units are mounted on the frame; in which a rear cabinet enclosure member is interiorly bolted to the frame; in which a front cabinet enclosure member is releasably pivotally mounted on the frame base member; and in which said front cabinet enclosure member is releasably locked by lock means to the frame; whereby the interior of the cabinet and components of the terminal mounted on the frame are completely accessible when the front cabinet enclosure member is unlocked and released from its pivotal connection.

* * * * *